Oct. 10, 1961     H. K. PELZER     3,003,611
CONVEYING DEVICE, ESPECIALLY FOR BULK MATERIAL
Filed March 11, 1960     3 Sheets-Sheet 1
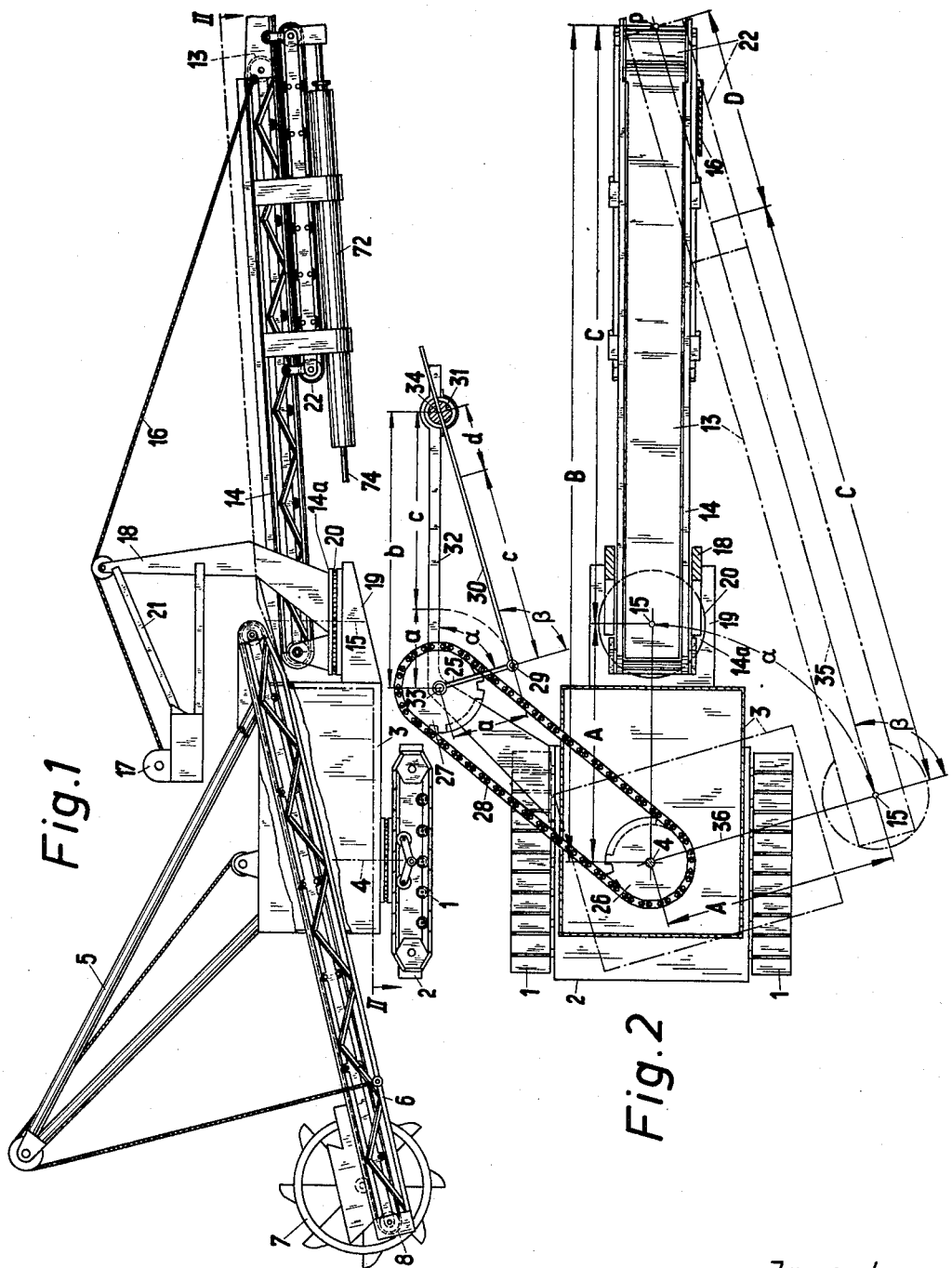
Inventor:

Oct. 10, 1961        H. K. PELZER        3,003,611
CONVEYING DEVICE, ESPECIALLY FOR BULK MATERIAL
Filed March 11, 1960        3 Sheets-Sheet 2
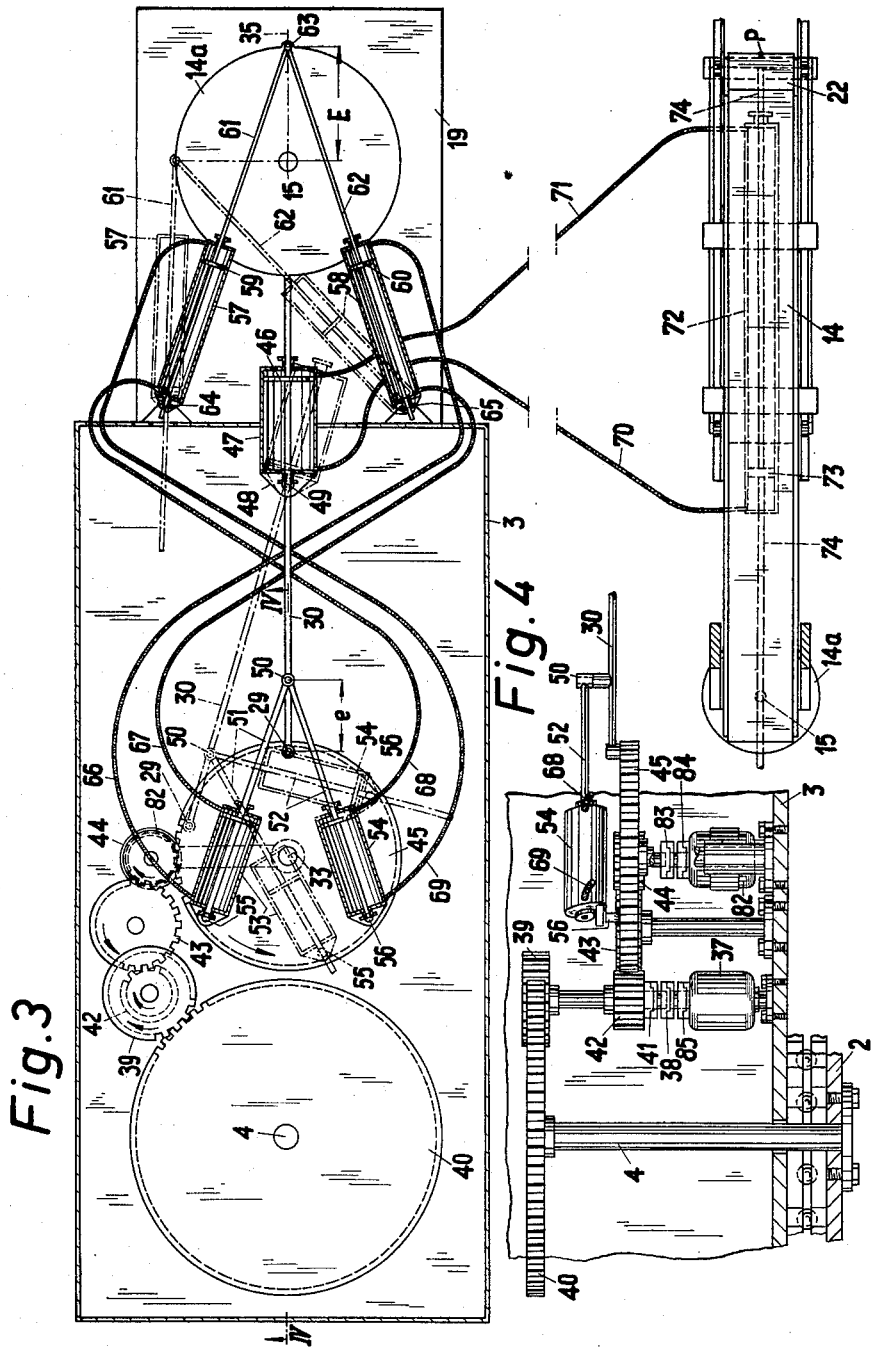
Inventor:

Oct. 10, 1961   H. K. PELZER   3,003,611
CONVEYING DEVICE, ESPECIALLY FOR BULK MATERIAL
Filed March 11, 1960   3 Sheets-Sheet 3

Inventor:

United States Patent Office 3,003,611
Patented Oct. 10, 1961

3,003,611
CONVEYING DEVICE, ESPECIALLY FOR
BULK MATERIAL
Hans K. Pelzer, Krefeld, Germany, assignor to Beteiligungs- und Patentverwaltungsgesellschaft mit beschränkter Haftung, Essen, Germany
Filed Mar. 11, 1960, Ser. No. 14,281
Claims priority, application Germany Mar. 19, 1959
4 Claims. (Cl. 198—88)

The present invention relates to a conveying device, for instance a loader for bulk material, or a dredge, having a lower structure and an upper structure adapted to be turned about a vertical axis relative to said lower structure and provided with a boom or arm carrying a loading belt, said boom or arm being mounted on the upper structure and being rotatable about a vertical axis offset with regard to the axis of rotation of the upper structure.

With devices of this type, no counterweight is required for the upper structure in view of the eccentric mount of the loading belt boom on the upper structure. However, when the upper structure is turned to one side or the other, as required when operating a scoop, such as a bucket wheel, mounted on the upper structure, the loading belt is likewise turned so that its discharge end will not stay over the charging funnel of the conveyor intended for removing the goods or over the respective truck. This movement of the loading belt, due to its eccentric location on the upper structure, cannot be compensated for by a mere turning back of the loading belt by the same angle by which the upper structure was turned in forward direction.

It is, therefore, an object of the present invention to provide a conveying device of the above general type, which will be so designed as to make it possible to maintain one point of the discharge end of the loading belt practically stationary with regard to the lower structure of the conveying device.

It is another object of this invention to provide a conveying device as set forth in the preceding paragraph, in which the conveying distance of the loading belt will be automatically extended or reduced.

It is still another object of this invention to provide a conveying device of the type set forth above which will be relatively simple in construction and operation.

These and other objects and advantages of the invention will appear more clearly from the following specification in connection with the accompanying drawings, in which:

FIG. 1 is a side view of a bucket wheel loader according to the present invention.

FIG. 2 represents a section taken along the line II—II of FIG. 1.

FIG. 3 illustrates the hydraulic means for adjusting the boom carrying the loading belt, the hydraulic means being shown in section but for use in connection with a construction somewhat different from that of FIG. 2.

FIG. 4 illustrates the driving means for the upper structure and the boom for the loading belt, said driving means being shown partially in view and partially in a vertical section along the line IV—IV of FIG. 3, the scale on which the boom for the loading belt is shown being less than that employed for the illustration of the upper structure.

General arrangement

Figure 5:
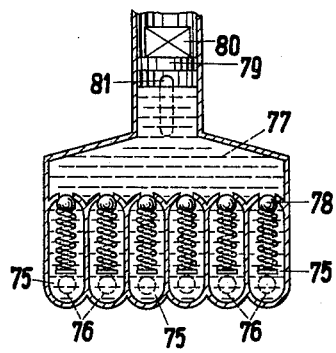
FIG. 5 illustrates a fluid collector for use in connection with the hydraulic system.
Figure 6:
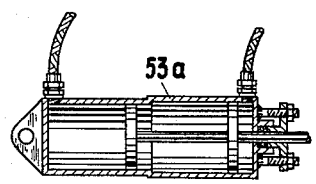
FIG. 6 illustrates a section through a detail of the arrangement of FIG. 3.
Figure 8:
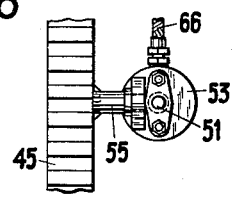
FIG. 8 illustrates a further detail of the construction shown in FIGS. 3 and 4.

The objects outlined above have been realized according to the present invention primarily in that in order to maintain a point of the discharge end of the loading belt in practically unchanged position with regard to the lower structure, a model in the form of a crank drive is employed the crank of which is automatically turned by the same respective angle as the upper structure while the connecting rod of said model is rotatably and longitudinally displaceably guided at a point having a fixed distance from the point of rotation of the crank. Furthermore, in conformity with the present invention, the ratio between the length of the crank and the length of said non-variable distance from the point of rotation of the crank substantially equals the ratio between the distance by which the axis of rotation of the upper structure and the axis of rotation of the loading belt are spaced from each other, and the distance by which the stationarily held point of the discharge end of the conveyor belt is spaced from the axis of rotation of the upper structure.

According to a further feature of the invention, means are provided which bring about that the angle formed by the longitudinal axis of the loading belt with the connecting line between the axes of rotation of the upper structure and the loading belt will always substantially equal the angle confined by the connecting rod and the crank of the model.

According to the invention, there are also provided means which will bring about that the conveying distance of the loading belt is always extended or reduced by that distance which, considering the model factor, corresponds to the longitudinal displacement of the connecting rod of the model in the above mentioned point having a fixed distance from the axis of rotation of the crank.

In order to assure that the angle formed by the longitudinal axis of the loading belt with the connecting line between the axes of rotation of the upper structure and the loading belt will always substantially equal the angle formed by the connecting rod and the crank, there is preferably provided a hydraulic conveying system. To this end, a point of the loading belt arm or boom is connected with two points of the upper structure of the device, whereas one point of the connecting rod of the model is connected with two points which are stationary with regard to the crank of the model. This connection is effected by fluid operable cylinder piston systems and piston rods associated therewith. The respective six points form two similar triangles. The partial triangles formed by the turning point of the loading belt with the respective triangle points are similar to the corresponding partial triangles which are formed by the crank pin of the model with the respective triangle points. The cylinders mounted on the model are by means of hoses or the like connected with the cylinders associated with the loading boom in such a way that the loading belt will always be turned in a direction opposite to the turning direction of the upper structure.

Hydraulic means are expediently also employed for the respective required extensions and reductions of the conveying distance of the loading belt. For instance, a piston mounted on the connecting rod of the model may be guided in a fluid filled cylinder rotatably journalled at the same point as the connecting rod and connected by means of hoses or the like with a cylinder on the loading belt arm in such a way that a piston guided in said cylinder displaces a portion of said last mentioned arm in conformity with the respective required extension or reduction of the conveying means.

Structural arrangement

Referring now to the drawings in detail and FIG. 1 thereof in particular, the bucket wheel loader shown therein comprises a lower structure 2 with two endless treads 1. Mounted on the lower structure 2 is an upper structure 3 which is turnable about a vertical axis 4. The upper structure 3 carries an arm or cantilever 5 having suspended thereon a boom or arm 6 with a bucket wheel 7. Supported by arm 6 is a belt 8 which extends beyond the turning axis 4 of the upper structure 3. The discharge end of said belt 8 is located above the pickup end of a conveying belt 13.

The conveying belt 13 has associated therewith an arm 14 which is rotatable about a vertical axis 15. To this end, the arm 14 is by means of ropes or cables 16 of a winch 17 suspended on a turret 18 of the upper structure 3, which, by means of a ball ring 20 is rotatably journalled on a bracket 19 connected to the upper structure 3. The turret 18 carries a counterweight arm 21 supporting winch 17. On arm 14 below the conveying belt 13 there is longitudinally displaceably mounted a short discharge belt 22.

Figure 7:
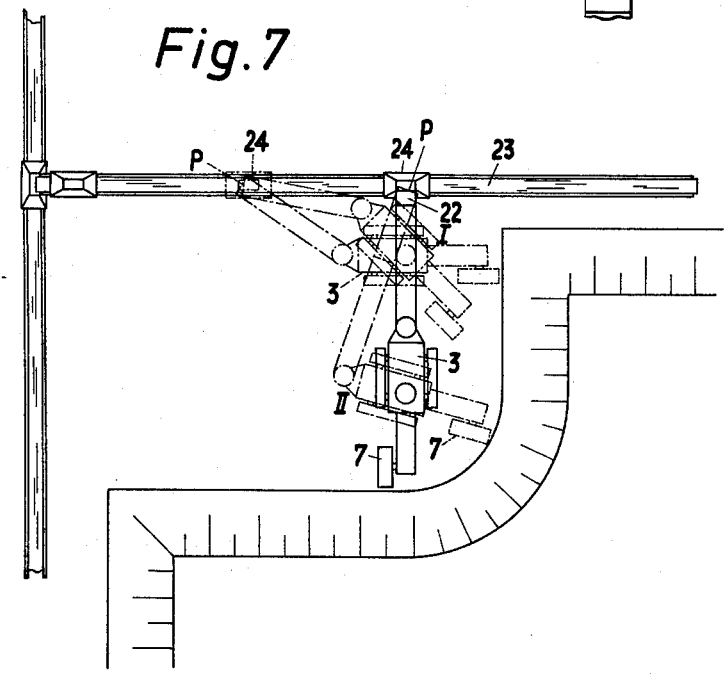
FIG. 7 is a diagrammatic top view of an area being mined or dug by a loader according to the invention, said figure also showing conveying means for removing the dug material from the place being dug.

By the means which will presently be described, it is assured that point P (FIG. 2) at the discharge end of belt 22 is, independently of the lateral turing movements of the upper structure 3, always automatically retained in its position with regard to the lower structure 2. Consequently, as shown in FIG. 7 the discharge of the goods from belt 22 will always be effected at the same point with regard to a certain position of the lower structure of the loader. In the position, designated I in FIG. 7, of the loader, the distance of the latter from the belt 23 mounted on a storage place, will be minimum. From the drawing it will be evident that with the turning movements carried out by the upper structure 3 with the bucket wheel 7, as necessitated by the work in block operation, point P at the discharge end of belt 22 will always remain at the same location above the load receiving carriage 24 movable over the belt 23.

When the dredge occupies the position designated II, the dredge is spaced from the conveyor belt 23 by the maximum distance. Also in this instance, point P at the discharge end of belt 22 will always remain at the same point above the charging carriage 24 regardless of the respective turning movements of the upper structure. It will thus be evident that by means of a device according to the invention, large block widths can be obtained.

FIG. 2 diagrammatically illustrates a model according to the invention by means of which the respectively required adjustment of the loading belt 13 and of the discharge belt 22 will be effected automatically.

The crank 25 of the model will always be turned by the same angle $\alpha$ by which the upper structure 3 is turned about axis 4. In conformity with FIG. 2, there are for this purpose provided two sprocket wheels 26, 27 fixedly connected to the upper structure 3 and crank 25 respectively and, furthermore, a chain 28 is employed. The connecting rod 30 pivotally connected to the crank pin 29 is longitudinally displaceably guided in a pivot 31 which latter is rotatable in the stationary arm 32 of the model about an axis 34 parallel to the crank axis 33.

By the means which will now be described, there will be assured that when turning the upper structure 3, the arm carrying the loading belt will be turned in opposite direction, and the longitudinal axis 35 of the loading belt 13 will together with the extension of the connecting line 36 between the tilting axes 15 and 4 always confine the same angle $\beta$ which is formed by the connecting rod 30 of the model with the extension of crank 25. Consequently, the longitudinal axis 35 will always have such a direction that it passes through point P corresponding to point 34 of the model. It is merely necessary to see to it that the discharging belt 22 will always automatically be displaced to such an extent that its discharge end will be located at point P. This displacement, as will be described further below, is effected in such a way that the displacement length D of the discharging belt 22 corresponds to that distance by which the connecting rod 30 of the model is displaced in the pivot 31.

Thus, the model forms a triangle 29, 33, 34 which is similar to the triangle 15, 4, P. Consequently, there exists the relationship $$\frac{a}{A}=\frac{b}{B}=\frac{c}{C}=\frac{d}{D}$$

In this equation, $a$ designates the crank radius of the model, while $b$ designates the length of the arm of the model, and $c+d$ designates the length of the connecting rod of the model. Furthermore, $c=b-a$. The letters A, B, C and D designate the corresponding lengths respectively pertaining to the upper structure and the belts 13, 22.

The hydraulic means for conveying the movements from the model to the loading belt 13 and the discharge belt 22 will now be described in connection with FIGS. 3 to 6.

Mounted in the operator's cab at the upper structure 3 is a turning motor 37 adapted through the intervention of a clutch 38 to drive a pinion 39. Pinion 39 meshes with a gear 40 which is fixedly connected to the lower structure 2. By means of clutch 41 it is possible drivingly to connect a pinion 42 with the shaft of the pinion 39. Pinion 42 is adapted through the intervention of an intermediate gear 43 to drive a pinion 44 which latter meshes with a gear 45. Pinions 42 and 44 have the same number of teeth, and the transmission ratio between gears 39 and 40 equals that between gears 44 and 45. Consequently, when clutches 38 and 41 are engaged, gear 45 will be rotated by the same angle by which the upper structure 3 is turned relative to the lower structure about axis 4. Rotation of gear 45, however, is effected in a direction opposite to that of the upper structure 3.

Gear 45 forms the crank of the model. Accordingly, in conformity with FIG. 2, its axis of rotation is designated with the reference numeral 33, and the point at which connecting rod 30 is linked thereto has been designated with the reference numeral 29. The lower end of connecting rod 30 is connected to a piston 46 reciprocably mounted in a cylinder 47. Cylinder 47 is by means of an extension 48 through which connecting rod 30 passes in longitudinally displaceable manner, rotatably journalled in upper structure 3 so as to be able to rotate about the vertical axis 49. When connecting rod 30 occupies the position illustrated in solid lines, it will form the straight extension of the connecting line between axes 29 and 33.

The connecting rod 30 has linked thereto two piston rods 51, 52 at a point 50 which is spaced from point 29 by a distance $e$. The pistons pertaining to the piston rods 51, 52 are reciprocably mounted in cylinders 53 and 54 respectively. The cylinders 53 and 54 are respectively linked at 55 and 56 to the gear 45. In the position shown in solid lines, points 50, 55, 56 form an isosceles which is symmetrical to the piston rod 30 and the crank distance 29, 33.

The boom 14 of the loading belt which is rotatably journalled on the upper structure 3 at point 15 is connected with the upper structure by means of two cylinders 57, 58 having reciprocably mounted therein pistons 59 and 60 respectively provided with corresponding piston rods 61 and 62. The piston rods 61 and 62 are pivotally connected to a disc 14a at a point 63 on the central axis 35, said point 63 being spaced from the axis of rotation 15 by the distance E. Disc 14a carries the boom 14. Point 63 defines together with points 64 and 65 an isosceles when the parts occupy the position shown in solid lines, said isosceles being located symmetrically with regard to the axis 35. The cylinders 57, 58 are pivotally connected to the upper structure 3 at points 64, 65. With regard to the remarks set forth in the preceding sentence, it is, of course, assumed that the axis 35 forms the straight extension of the connecting line between the axes of rotation 15 and 4 of the loading belt end of the upper structure 3 respectively. The triangle 63, 64, 65 is similar to the triangle 50, 55, 56, and also the partial triangles 15, 63, 64 and 15, 63, 65 are similar to the corresponding partial triangles 29, 50, 56 and 29, 50, 55 respectively. The distances E and e are thus proportional to each other to the same extent as for instance the distances 63, 64 and 50, 56.

The two ends of cylinder 53 of the model communicate with the two ends of cylinder 58 through two hoses 66, 67. In a corresponding manner, the two ends of model cylinder 54 communicate with the two ends of cylinder 57 through hoses 68, 69. All of the cylinders and hoses are filled with a liquid. By correspondingly selecting the relationship between the diameter of the cylinder associated with the model and the cylinder associated with the boom for the loading belt, it is possible to assure that when turning the upper structure 3, the boom 14 will always be turned by the same angle β relative to the upper structure 3 by which angle the connecting rod 30 of the model is turned relative to the crank 25. The positions which on one hand will be occupied by the model and on the other hand will be occupied by the cylinders and pistons of the boom when turning the loading belt by an angle β, are illustrated in FIG. 3 in dot-dash lines.

Both ends of cylinder 47 communicate through hoses 70, 71 with the ends of a cylinder 72 which is located on the boom 14. The piston rod 74 of a piston 73 reciprocably mounted in cylinder 72 is connected to the carrier for the discharging belt 22. When during the turning movement of the upper structure 3 the connecting rod 30 is for instance turned to the position shown in dot-dash lines, piston 46 will be displaced in cylinder 47 by a distance d. Consequently, due to the hydraulic transmission, piston 73 together with loading belt 22 will be displaced outwardly by the distance D. It should be noted that in FIG. 3 the boom 14, belt 22 and cylinder 72 with piston 73 are shown on a smaller scale than the remaining parts. The diameter of cylinder 72 is at any rate so selected that the displacement D of the discharge belt 22 will be proportional to the displacement d of the model piston 46 to the same extent as the distance of the axes 15, 4 (A in FIG. 2), to the crank radius 29, 33 of the model (a in FIG. 2). As a result thereof, point P at the discharge end of belt 22 will during all turning movements maintain the same position with regard to the lower structure 2.

In order to assure that from each cylinder 53, 54, 57, 58, 47 and 72 at one end of the respective piston there will always be discharged the same quantity of liquid which enters the respective cylinder on the other end, the piston rods extend through the respective entire cylinders so that stuffing boxes must be provided on both sides. However, if desired, it is also possible instead to provide stepped pistons (FIG. 6) as for instance cylinder 53a with two pistons of different sizes.

All of the cylinders may be connected to a fluid container common thereto. In this instance, expediently, each of the six cylinders communicates with one of the chambers 75 of a container as illustrated in FIG. 5. The conduit connections are designated with the reference numeral 76. The chambers 75 are adapted to communicate with the superimposed storage chamber 77 through a spring-biased ball valve 78. In one of the upwardly extending cylindrical extensions of the container there is reciprocably mounted a piston 79 which is loaded by a weight 80. Air escaping from the liquid may collect between pistons 79 and the liquid. The weight 80 is so dimensioned that when no material pressure above atmospheric pressure prevails in cylinders 53 etc., in other words when no movements are conveyed, the thrust of the springs acting upon valve 78 will be overcome by said weight 80. Consequently, leakage which might occur at any point of the hydraulic system will be compensated for by liquid from chamber 77. On the other hand, weight 80 is not strong enough to be able to produce any working operations of the pistons. The level of the liquid in chamber 77 may be observed through a sight glass 81 so that, if necessary, the liquid may be supplemented.

If it is desired to turn boom 14 independently of a movement of the upper structure 3, it is merely necessary to disengage clutch 41 (FIG. 4) and to drive the pinion 44 by a second turning motor 82 through the intervention of a clutch 83.

However, it may also be required under certain circumstances that the boom 14 is to be turned together with the upper structure. In such an instance, the clutch 41 is likewise disengaged, whereas clutch 83 will be engaged. Pinion 45 will then be blocked with regard to the upper structure in view of the fact that motor 82 is by means of a brake 84 prevented from turning relative to the upper structure. Also motor 37 is provided with a brake 85 thereby making it possible to retard the turning movements in conformity with the requirements. It is, of course, understood that the possible turning movements may be limited by electric limit switches.

It is, of course, to be understood that the present invention is, by no means, limited to the construction shown in the drawings but also comprises any modifications within the scope of the appended claims.

What I claim is:

1. A conveying device which comprises: a lower structure, an upper structure adapted to turn relative to said lower structure about a vertical axis, an arm supported by said upper structure and adapted to turn relative to said lower structure about a vertical axis offset with regard to the axis of rotation of said upper structure, conveyor belt means supported by said arm and having a discharge station, crank drive means including a crank member operatively connected to said upper structure so as to turn together with the latter by the same angle as said upper structure, said crank drive means also including a connecting rod having one end pivotally connected to said crank member at a point spaced from the axis of rotation of said crank member, rotatable guiding means held at a certain distance from the axis of rotation of said crank member for rotatably and longitudinally displaceably guiding the free end portion of said connecting rod, the ratio of the crank section between the axis of rotation of said crank member and its pivotal connecting point with said connecting rod to the distance between the axis of rotation of said crank member and the axis of rotation of said guiding means substantially equalling the ratio of the distance between the axis of rotation of said upper structure and the axis of rotation of said arm to the distance between the axis of rotation of said upper structure and said discharge station, means maintaining the angle β defined by the longitudinal axis of said conveyor belt means and the extension of the connecting line between the axis of rotation of the upper structure and the axis of rotation of said arm substantially equalling the angle defined by the extension of the crank member with the connecting rod, and means operatively connected to said conveyor belt means for respectively extending and reducing the total conveying length of said conveyor belt means by a distance corresponding to the longitudinal displacement of said connecting rod in said guiding means in one and the opposite direction.

2. A conveying device which comprises: a lower structure; an upper structure adapted to turn relative to said lower structure about a vertical axis; a cantilever supported by said upper structure and adapted to turn relative to said lower structure about an axis spaced from the axis of rotation of said upper structure; conveyor belt means supported by said cantilever and having a discharge station, said conveyor belt means comprising a first conveyor belt and a second conveyor belt arranged below said first conveyor belt and movable relative thereto and in longitudinal direction thereof; a crank member rotatably connected to said upper structure to rotate therewith at the same respective angle as the latter; a connecting rod having one end portion pivotally connected to said crank member at a point spaced from the axis of rotation of said crank member; a rotatable guiding means held at a fixed distance from the axis of rotation of said crank member for rotatably and longitudinally displaceably guiding the free end portion of said connecting rod; the triangle defined by the axis of rotation of said crank member, the pivotal connection of said crank member with said connecting rod, and the axis of rotation of said guiding means when said crank member and said connecting rod form an angle with each other being proportional to the triangle defined by the connecting line of said discharge station with the axis of rotation of said upper structure, said upper structure, and the connecting line of said axis of rotation of said cantilever when said last mentioned connecting line forms an angle with the connecting line of said discharge station with said axis of rotation of said upper structures, and the connecting line of said axis of rotation of said upper structure with the axis of rotation of said cantilever; a cylinder supported by said upper structure and rotatable about the axis of rotation of said guiding means; a fluid operable piston reciprocably mounted in said cylinder and connected to said connecting rod; control cylinder piston means supported by said cantilever and operatively connected to said second conveyor belt for actuating the same in either direction; and fluid conveying means for establishing fluid connection between either side of said piston and said control cylinder piston means.

3. In an arrangement according to claim 1, in which said crank member is formed by a disc, and in which said arm is also rotatable relative to said upper structure: three fixed pivots carried by said disc and defining an isosceles with each other; two first fluid operable cylinder piston means having one member thereof pivotally connected to those two of said three pivots which define the basis of said isosceles and having another member thereof pivotally connected to said connecting rod at a common pivot axis, said connecting rod being pivotally connected to the third one of said three pivots; a fourth pivot supported by said arm and located in the central longitudinal vertical plane thereof in spaced relationship to the axis of rotation of said arm; two second fluid operable cylinder piston means respectively having one member connected to said arm at said fourth pivot; a fifth and a sixth pivot supported by said upper structure and respectively having another member of said two second cylinder piston means pivotally connected thereof; said fifth and sixth pivots and said axis of rotation of said arm forming a second isosceles with the basis thereof formed by said fifth and sixth pivots; the ratio of the maximum distance between said third pivot and said common pivot axis to the distance between said fourth pivot and the axis of rotation of said arm substantially equalling the ratio of the maximum distance between either one of said first and second pivots and said common pivot axis to the maximum distance between said fourth pivot and either one of said fifth and sixth pivots; and fluid conveying means interconnecting corresponding portions of said first and second cylinder piston means.

4. An arrangement according to claim 3, which includes a main reservoir for storing fluid and also comprises a plurality of separate chambers respectively communicating with one of the cylinders of said first and second fluid operable cylinder piston means, and check valve means respectively associated with said chambers and closing the same in response to a certain minimum pressure in the respective fluid cylinder piston means communicating therewith, said check valve means opening in response to a pressure in the respective cylinder piston means below said certain minimum pressure.

References Cited in the file of this patent
UNITED STATES PATENTS
2,757,782  Davis _____ Aug. 7, 1956